ical patents

United States Patent [19]

Fiori, Jr.

[11] Patent Number: 4,663,589

[45] Date of Patent: May 5, 1987

[54] DISPLACEMENT SENSOR HAVING MULTIPLEXED DUAL TANK CIRCUITS

[75] Inventor: David Fiori, Jr., Yardley, Pa.

[73] Assignee: Sensor Technologies, Inc., Bensalem, Pa.

[21] Appl. No.: 821,982

[22] Filed: Jan. 29, 1986

Related U.S. Application Data

[63] Continuation-in-part of Ser. No. 700,081, Feb. 11, 1985.

[51] Int. Cl.⁴ .............................................. G01B 7/14
[52] U.S. Cl. .................................. 324/208; 324/236; 340/870.31
[58] Field of Search ............... 324/207, 208, 236, 233, 324/228; 340/870.31, 870.32, 870.33, 870.34, 870.35, 941

[56] References Cited

U.S. PATENT DOCUMENTS 3,967,064  6/1976  Sigworth .................... 340/870.31 X
4,013,911  3/1977  Fujiwara et al. ........... 340/870.32 X
4,053,849  10/1977  Bower et al. ................... 324/207 X
4,503,922  3/1985  Brosh et al. ................. 177/210 EM

*Primary Examiner*—Reinhard J. Eisenzopf
*Assistant Examiner*—Robert W. Mueller
*Attorney, Agent, or Firm*—Ratner & Prestia

[57] ABSTRACT

Non-contacting sensor apparatus having two tank circuits from which an indication of the position of the moving part of the sensor is developed by measuring the relative resonance frequencies of the two tank circuits. As the moving part of the sensor changes position, the relative resonance frequencies of the two tank circuits change. The outputs of the two tank circuits are multiplexed and drive a pulse generator which develops a first series of pulses having a repetition rate which corresponds to the resonance frequency of one of the tank circuits and a second series of pulses having a repetition rate which corresponds to the resonance frequency of the other tank circuit. The relative times required to count the same number of pulses of each series of pulses provides an indication of the position of the moving part of the sensor.

16 Claims, 10 Drawing Figures

DISPLACEMENT SENSOR HAVING MULTIPLEXED DUAL TANK CIRCUITS

RELATED APPLICATION

This application is a continuation-in-part of application Ser. No. 700,081 filed Feb. 11, 1985.

TECHNICAL FIELD

The present invention relates, in general, to sensors which develop signals corresponding to variations in a parameter being monitored. The invention is concerned particularly with inductance coil sensors and the circuitry for processing the sensor signals to develop indications of changes in the parameter being monitored.

BACKGROUND ART

Non-contacting sensors are well-known. Such sensors may include one or more stationary inductance coils and a movable member which moves in the field of the stationary inductance coils in accordance with the parameter being monitored to change the inductance of the stationary coils. Non-contacting sensors are especially useful because they are not subject to wearing as are those sensors in which the moving and stationary parts are in contact. For example, in a simple potentiometer having a wiper blade which moves along a resistance winding, the constant moving, frictional contact between the wiper blade and the resistance winding will cause wear of one or both parts.

One technique for processing the signals of an inductance coil sensor to develop an indication of the parameter being monitored involves measuring the effect of a shift in resonance frequency of a tank circuit which includes, as one of its components, the stationary inductance coil. As the movable member alters the inductance of the stationary inductance coil, a corresponding shift in resonance frequency of the tank circuit is developed.

Such an approach, which may be characterized as time-dependent because frequency is a time-related variable, is to be contrasted with analog techniques, exemplified, for example, by a contacting potentiometer sensor and a non-contacting linear variable differential transformer (LVDT) sensor. Analog signal processing techniques are more sensitive to circuit component variations than are time-dependent signal processing techniques. Moreover, analog signal processing techniques require calibration and employ relatively large numbers of discrete circuit components. Consequently, time-dependent signal processing is favored.

DISCLOSURE OF THE INVENTION

Accordingly, it is an objective of the present invention to provide new and improved inductance coil sensor apparatus.

It is another objective of the present invention to provide inductance coil sensor apparatus which is accurate and reliable in operation.

It is a further objective of the present invention to provide inductance coil sensor apparatus which is efficient and employs a minimum number of circuit components in its signal processing circuitry.

These and other objectives are achieved, according to the present invention, by sensor apparatus which includes an inductance coil sensor composed of first and second tank circuits and a movable metal member which when moved, relative to the inductance coil of the first and the second tank circuits, in accordance with changes in a parameter being monitored changes the relative resonance frequencies of the tank circuits. Also included are circuit means responsive to changes in the relative resonance frequencies of the tank circuits for developing indications of changes in the parameter being monitored. Such circuit means include a pulse generator, a counter and tank circuit switching means. The pulse generator produces a first series of pulses having a repetition rate corresponding to the resonance frequency of the first tank circuit and a second series of pulses having a repetition rate corresponding to the resonance frequency of the second tank circuit. The counter, responsive to the first and second series of pulses, counts a prescribed number of pulses of the first series and the same number of pulses of the second series and develops a first counter output pulse having a duration proportional to the time required to count the prescribed number of pulses of the first series and a second counter output pulse having a duration proportional to the time required to count the prescribed number of pulses of the second series. The tank circuit switching means connect the first and the second tank circuits to the pulse generator in timed alternating sequence.

BEST MODE OF CARRYING OUT THE INVENTION

Figure 1:
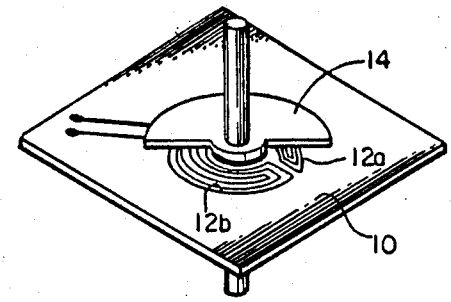
FIG. 1 is a perspective view of one inductance coil sensor which may be used in the present invention.

Referring to FIG. 1, an inductance coil sensor which may be used in the present invention includes an insulating board 10 having first and second stationary inductance coils 12a and 12b. As shown, stationary inductance coils 12a and 12b may be planar and formed by conventional printed circuit.

Spaced from insulating board 10 is a movable member 14 which serves as a spoiler as it moves above stationary inductance coils 12a and 12b. Spoiler 14, in the form of a planar metal part, is mounted on a shaft which, in turn, is coupled to another rotating component (not shown), the movement of which represents the parameter being monitored.

Figure 2:
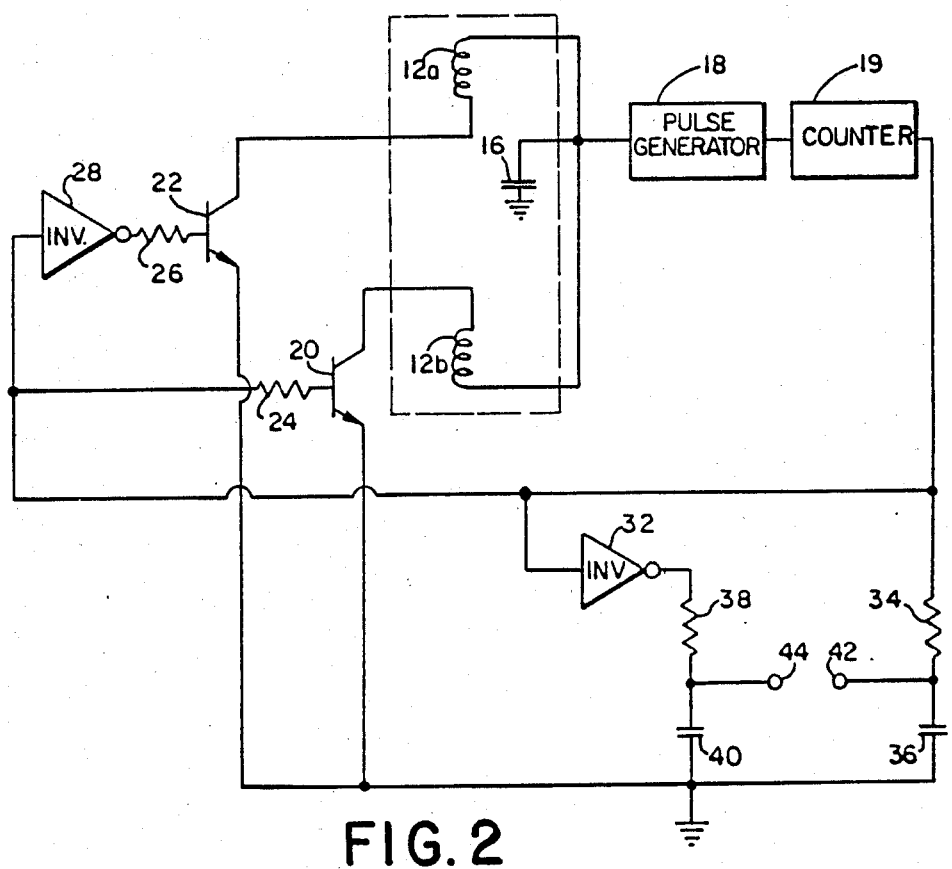
FIG. 2 is a circuit diagram of one preferred embodiment of sensor apparatus constructed in accordance with the present invention.

FIG. 2, which is a circuit diagram of one preferred embodiment of sensor apparatus constructed in accordance with the present invention, shows how an indication of the position of spoiler 14 is developed. Stationary inductance coils 12a and 12b and a capacitor 16 form a pair of tank circuits which are connected, in timed alternating sequence, to frequency sensing means composed of a pulse generator 18 and a counter 19. In particular, coils 12a and 12b, are switched, in timed alternating sequence, to the input of pulse generator 18 by a switching circuit composed of a pair of transistors 20 and 22, a pair of resistors 24 and 26, and an inverter 28.

At any particular time, the tank circuit composed of stationary inductance coil 12a and capacitor 16 or the tank circuit composed of stationary inductance coil 12b and capacitor 16 is connected to pulse generator 18. Waveforms (A) and (B) of FIG. 4 represent the two different resonance frequencies of the two tank circuits. The higher frequency of waveform (B) represents the condition of spoiler 14 being more in the vicinity of stationary inductance coil 12a than in the vicinity of stationary inductance coil 12b.

Waveform (C) represents the output of pulse generator 18. During those periods when coil 12b is connected to pulse generator 18, the repetition rate of the output of the pulse generator corresponds to the resonance frequency of the tank circuit formed by coil 12b and capacitor 16. During those periods when coil 12a is connected to pulse generator 18, the repetition rate of the output of the pulse generator is higher and corresponds to the higher resonance frequency of the tank circuit formed by coil 12a and capacitor 16.

The output of pulse generator 18 is supplied to counter 19 which measures the amount of time required to count a specific number of pulses. For the example shown in FIG. 3, four pulses, two positive-going and two negative-going, are counted, and after the prescribed number of pulses have been counted, a new count is started. With the start of each new count, the output of counter 19 changes level to form pulses having durations corresponding to the time required to count the prescribed number of pulses. This is shown in waveform (D) in FIG. 3. The higher level of the counter output signal represents the resonance frequency of the tank circuit formed by stationary inductance coil 12b and capacitor 16, while the lower level of the counter output signal represents the resonance frequency of the tank circuit formed by stationary inductance coil 12a and capacitor 16. The relative time durations of the counter pulses of waveform (D) provide an indication of the position of spoiler 14 relative to coils 12a and 12b. The output of counter 19 also controls the operation of the switching circuit which switches the input of pulse generator 18 between coils 12a and 12b.

Figure 3:
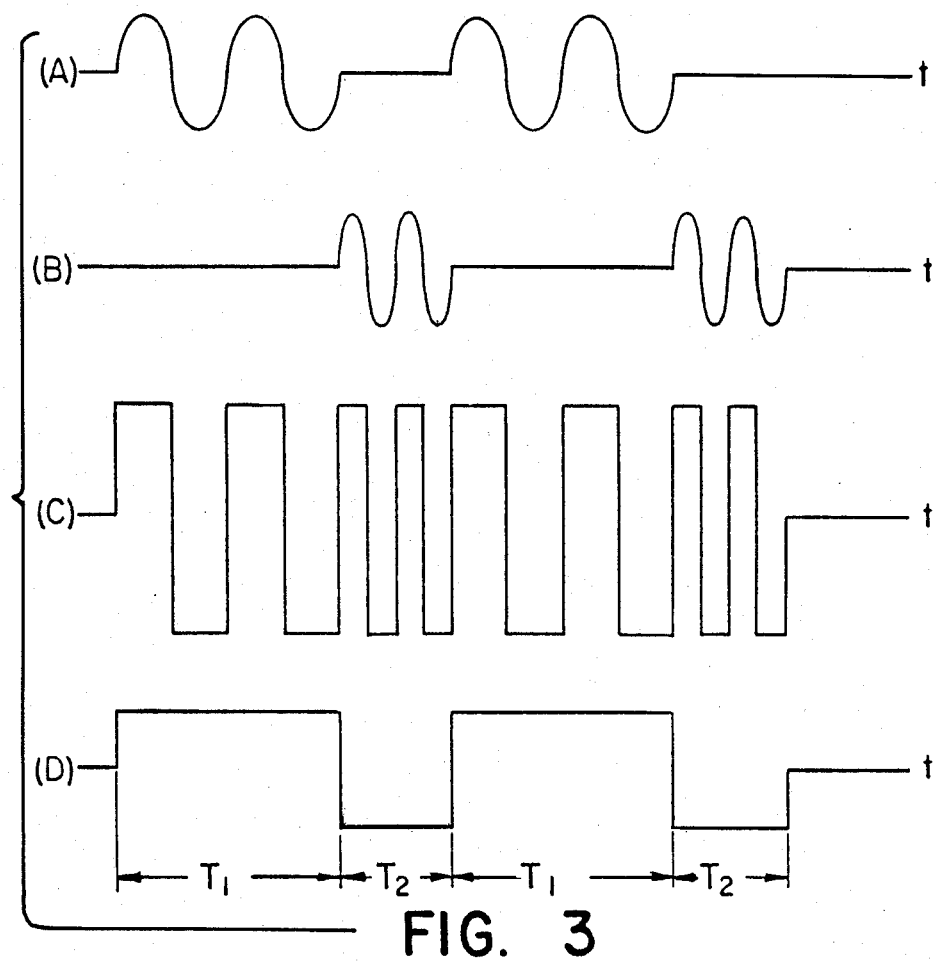
FIG. 3 is a series of waveform diagrams useful in understanding the operation of the FIG. 2 circuit.

An output indication, representative of the position of the spoiler, is developed by an inverter 32, a first RC circuit composed of a resistor 34 and a capacitor 36, and a second RC circuit composed of a resistor 38 and a capacitor 40. The signal at a terminal 42 between resistor 34 and capacitor 36 has a value proportional to:

$$\frac{T_1}{T_1 + T_2}$$

where $T_1$ and $T_2$ are identified in FIG. 3, while the signal at a terminal 44 between resistor 38 and capacitor 40 has a value proportional to:

$$\frac{T_2}{T_1 + T_2}$$

The difference in the signals at terminals 42 and 44 is proportional to:

$$\frac{T_1 - T_2}{T_1 + T_2}$$

A change in position of the spoiler will change the relative resonance frequencies of the two stationary tank circuits which, in turn, changes the repetition rates of the output of pulse generator 22. This causes a corresponding change in the relative values of $T_1$ and $T_2$ at the output of counter 19 and thereby changes the difference in the signals at terminals 42 and 44.

Figure 4A:
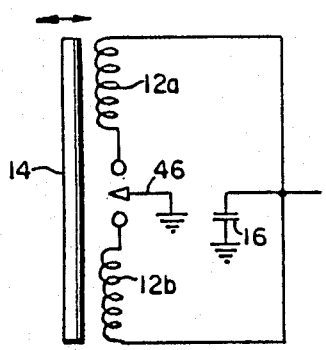
FIGS. 4A, 4B and 4C are schematic diagrams of three different types of tank circuits which may be used in the FIG. 2 circuit.
Figure 4B:
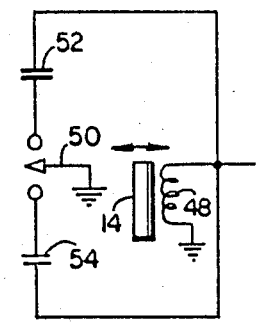
Figure 4C:
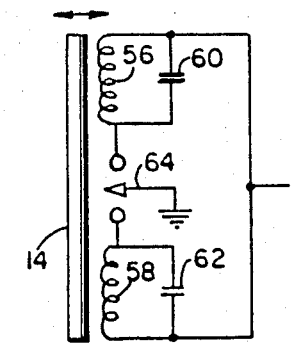

FIGS. 4A, 4B, and 4C show schematically three different types of tank circuits which may be used in the FIG. 2 circuit. The tank circuits in FIG. 4A represent the ones shown in FIG. 2. A switch 46 represents the action of the FIG. 2 switching circuit in connecting either stationary inductance coil 12a or stationary inductance coil 12b to the pulse generator (not shown) to form one or the other of the tank circuits with capacitor 16. Spoiler 14 also is shown in FIG. 4A and its movement is represented by the double-ended arrow.

In FIG. 4B, the tank circuits have a single stationary inductance coil 48 which is connected to the pulse generator (not shown). Coil 48 is switched, in timed alternating sequence, by the switching means, represented by a switch 50, between two capacitors 52 and 54 to form the two tank circuits.

In FIG. 4C, the two tank circuits each have a stationary inductance coil 56 or 58 and a capacitor 60 or 62. The two tank circuits are switched, in timed alternating sequence, by the switching means, represented by a switch 64, to the input of the pulse generator (not shown).

It will be understood that the stationary inductance coils, shown as planar coils, and the spoiler, shown as a planar solid member, may take different forms. For example, the stationary inductance coils may be wound and the spoiler may be a planar coil.

Figure 5:
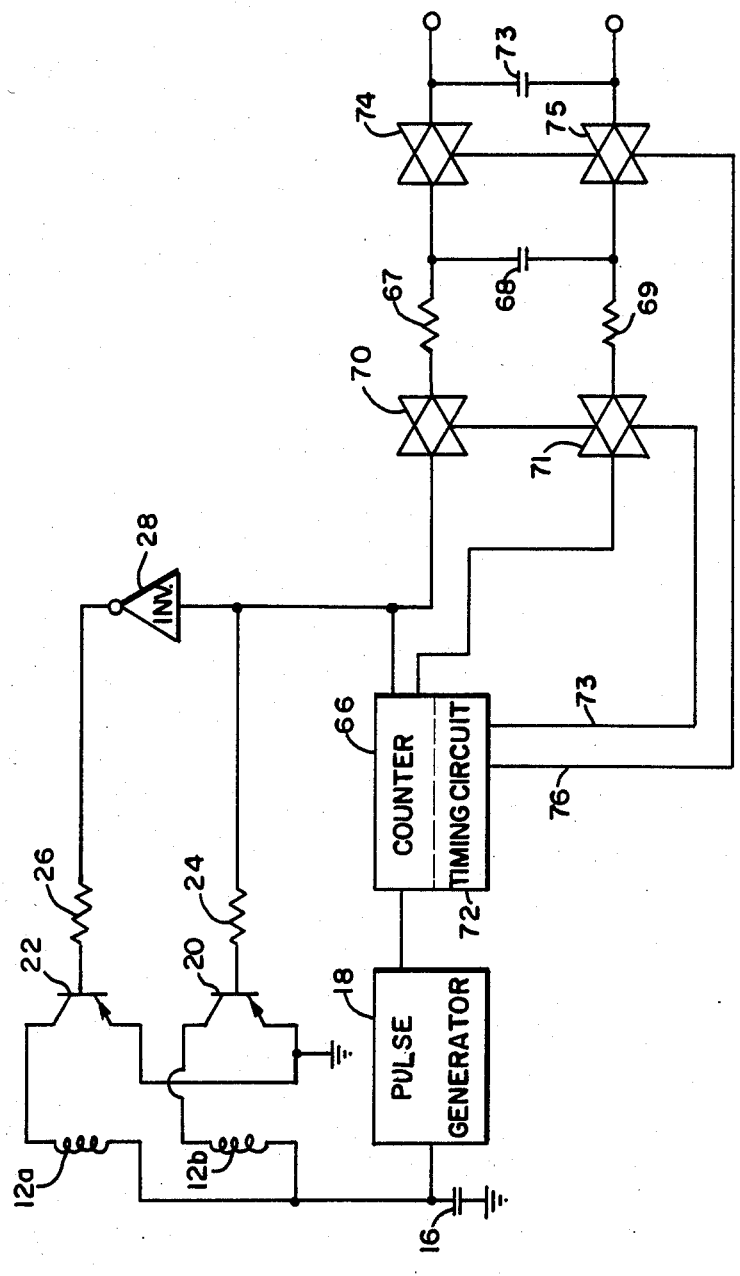
FIG. 5 is a circuit diagram of a second preferred embodiment of sensor apparatus constructed in accordance with the present invention.

The second embodiment of the present invention, shown in FIG. 5, is generally similar to the first embodiment, shown in FIG. 2. Elements in FIG. 5 corresponding to elements in FIG. 2 have been given the same reference numerals.

In the FIG. 5 circuit, the pulses from pulse generator 18 are supplied to the counter portion 66 of a counter/-timing circuit unit to develop a counter output signal such as the one represented by waveform (D) of FIG. 3. Waveform (E) of FIG. 6 shows two cycles of the counter output signal for two different positions of the sensor spoiler.

Figure 6:
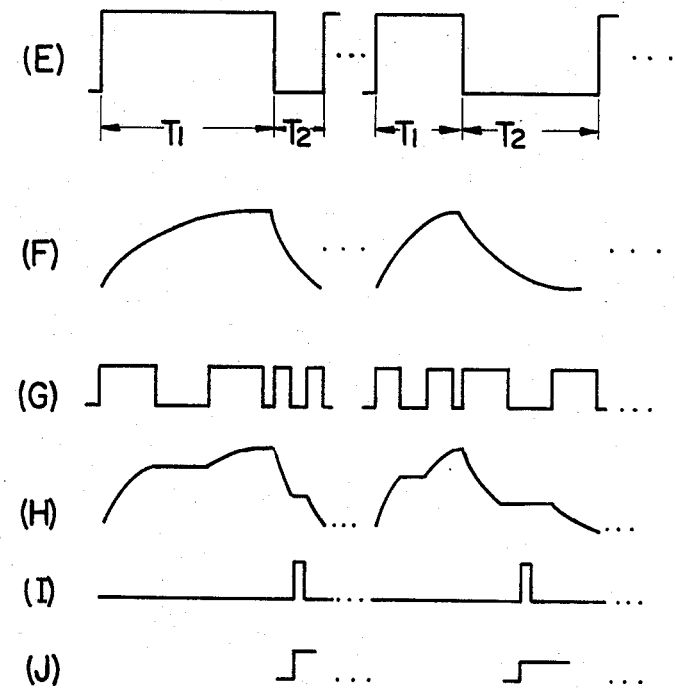
FIG. 6 is a series of waveform diagrams useful in understanding the operation of the FIG. 5 circuit.

The counter output signal is supplied to integrating means which develop an integration signal, represented by waveform (F) in FIG. 6, composed of a rising portion developed during time $T_1$ from the positive-going first counter output pulse and a decaying portion developed during time $T_2$ from the negative-going second counter output pulse. In its simplest form, the integrating means include a resistor 67 and a capacitor 68. However, for the embodiment of the present invention illustrated in FIG. 5, the integrating means also include a second resistor 69 to which an inverted version of the counter output signal is supplied. This arrangement having a pair of integration circuits with a common capacitor, provides a differential output across capacitor 68 proportional to:

$$\frac{T_1 - T_2}{T_1 + T_2}$$

Changes in the difference in the rates of the pulses from pulse generator 18 cause changes in the relative values of $T_1$ and $T_2$. This, in turn, causes changes in the difference in the signals across capacitor 68. Although the embodiment of the present invention illustrated in FIG. 5 has a capacitor which is multiplexed between two resistors, two distinctly separate integrating circuits, each having a resistor and a capacitor, may be used. Also, in its broadest application, the present invention can include only one integrating circuit if differential operation is not needed.

Disposed between counter 66 and the integrating circuits are first switching means for selectively connecting the counter to the integrating circuits. Such switching means may include an electronic switch 70 which selectively couples the counter signal to the integrating circuit composed of resistor 67 and capacitor 68 and an electronic switch 71 which selectively couples the inverted version of the counter signal to the integrating circuit composed of resistor 69 and capacitor 68.

Switches 70 and 71 are controlled by the timing circuit portion 72 of the counter/timing circuit unit which supplies a first control signal along an output line 73 to switches 70 and 71 to disconnect counter 66 from the integrating circuit composed of resistor 67 and capacitor 68 and to disconnect counter 66 from the integrating circuit composed of resistor 69 and capacitor 68. The first control signal supplied by timing circuit 72 is represented by waveform (G) in FIG. 6 and is effective in interrupting development of the integration signals. Waveform (H) represents the effect of the first control signal from timing circuit 72 on the development of the integration signal developed at the junction of resistor 67 and capacitor 68. An identical signal, but oppositely directed to the one represented by waveform (H), is developed at the junction of resistor 69 and capacitor 68. So long as the first control signal is positive, switches 70 and 71 are closed and capacitor 68 functions in the usual way in charging and discharging according to the signals supplied by counter 66. When the level of the first control signal drops to zero, switches 70 and 71 open and the condition of capacitor 68 remains unchanged while the switches remain open. The levels of the integration signals remain at the levels at the start of the interruption. This is represented by the flat portions of waveform (H). When switches 70 and 71 are again closed by the control signal, capacitor 68 resumes charging and discharging according to the signals supplied by counter 66.

The timing of the closing of switches 70 and 71 is selected at the mid-points of the rise and decay portions of the integration signals to approximate the average levels of the integration signals. As will become apparent, the durations of the closing of switches 70 and 71 can be relatively short and shorter than illustrated in waveforms (G) and (H). However, timing circuit 72 is simplified by making the open time of switches 70 and 71 equal to the closed times which precede and follow the open times, thereby centering the interruptions of the development of the integration signal in the rising and decaying portions of the integration signal.

A capacitor 73 serves to store the levels of the integration signals during periods of interruption in the development of the integration signals. Disposed between capacitor 73 and the integrating circuits are second switching means for selectively connecting the integrating circuits to this capacitor. Such switching means may include a pair of electronic switches 74 and 75 which selectively transfer the level of the integration signals to capacitor 73 during selected interruptions of the development of the integration signals.

Switches 74 and 75 also are controlled by timing circuit 72 which supplies a second control signal along an output line 76 to switches 74 and 75 to connect capacitor 73 to capacitor 68. The second control signal supplied by timing circuit 72 along output line 76 is represented by waveform (I) in FIG. 6. This signal is composed of pulses which are present during selected open times of switches 70 and 71 during the decay portions of the integration signal and sample the level of the integration signal during these periods of interruption of the development of the integration signal. In this way, the control signal supplied to switches 74 and 75 is effective in transferring the level of the integration signal, as shown by the second flat portion of each cycle of waveform (H), to capacitor 73.

Waveform (J) in FIG. 6 represents the level of the integration signals transferred to capacitor 73. By interrupting the development of the integration signals at the mid-points of the rise and decay times, the levels of the integration signals during the interruptions closely approximate the average value of the integration signals. It will be understood that this result is produced whether the integrating means include only one integration circuit or two integration circuits arranged to develop a differential signal. The only difference between the two is the magnitude of the signals. If greater accuracy is required, both the levels of interruption during the rise portions and the levels of interruption during the decay portions can be sampled with the output signal being developed by averaging the two.

For a more complete description of the circuitry for processing the output of pulse generator 18 in FIG. 5, reference is made to Applicant's copending application Ser. No. 800,984 filed Nov. 22, 1985, and entitled "Digital-to-Analog Converter".

Figure 7:
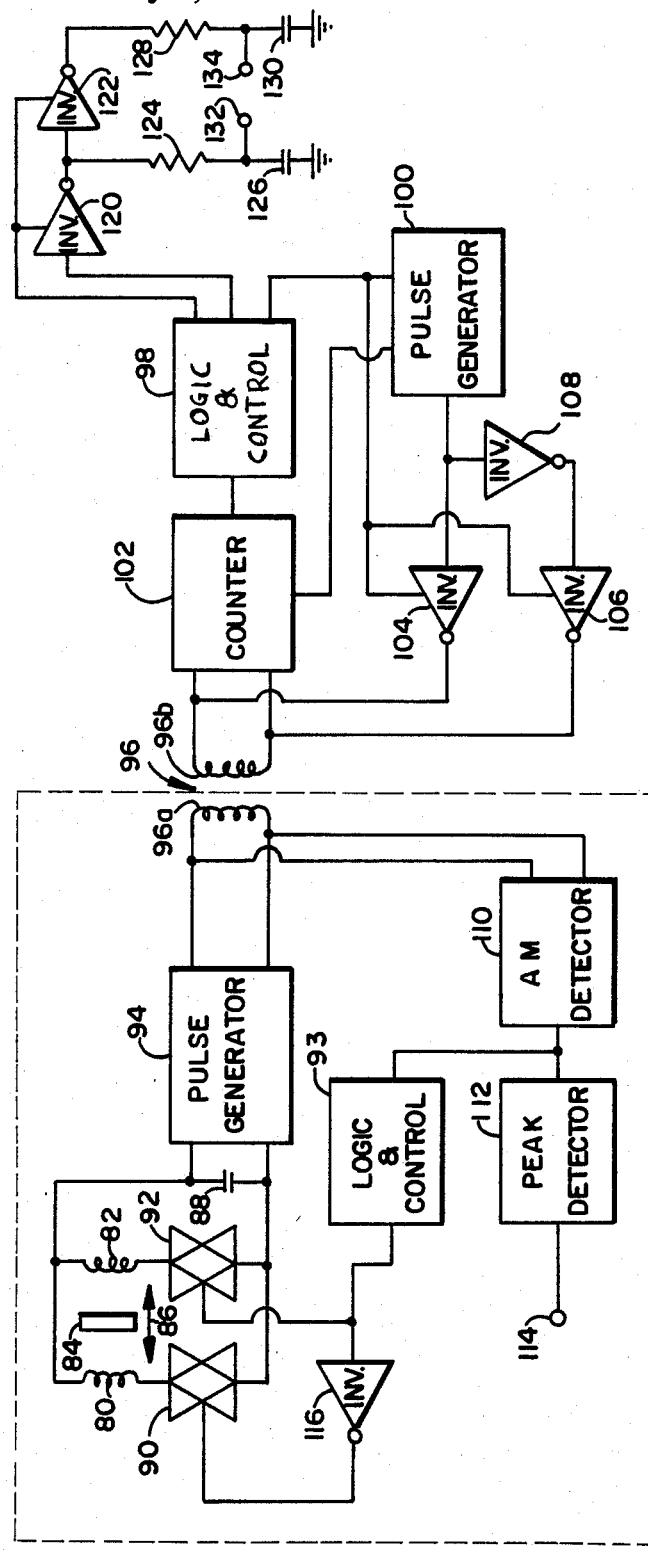
FIG. 7 is a circuit diagram of a third preferred embodiment of sensor apparatus constructed in accordance with the present invention.

FIG. 7, which is a circuit diagram of a third preferred embodiment of the present invention, illustrates that the present invention can be employed in sensing relative movements within a moving assembly. One such application of the present invention is sensing the twist imparted to a torqued rotating shaft.

The dashed lines in FIG. 7 represent the placement of those components within the dashed lines on a moving assembly, such as a steering column of an automobile. The remaining components are on a stationary assembly which is mechanically isolated from the moving assembly. Applicant's copending application, Ser. No. 757,726 filed July 22, 1985 and entitled "Sensor Apparatus" illustrates a sensor unit which can be employed in the FIG. 7 embodiment of the present invention. A pair of inductance coils 80 and 82 (FIG. 7), can be carried, as shown in application Ser. No. 757,726, on a pair of angularly spaced insulating boards. Twist imparted to a shaft to which the boards are secured is sensed as a vane 84 (FIG. 7), extending between the coils and secured to the shaft at a different point, moves toward one coil and away from the other coil. Arrow 86 in FIG. 7 represents the movement of vane 84 relative to coils 80 and 82. With coils 80 and 82 secured to the shaft at one axial location and vane 84 secured to the shaft at a different axial location, the changes in position of the vane, relative to the positions of the coils, correspond to the twist imparted to the shaft.

Inductance coils 80 and 82 and a capacitor 88 form a pair of tank circuits which are connected, in timed alternating sequence, through a pair of electronic switches 90 and 92 controlled by a first logic and control circuit 93 to a first pulse generator 94. The control of electronic switches 90 and 92 will be described shortly.

Pulse generator 94 produces pulses at a repetition rate corresponding to the resonance frequency of the particular tank circuit connected to the input of the pulse generator. The resonance frequencies of the two tank circuits are determined by the inductances of the coils 80 and 82 which, in turn, are dependent upon the position of vane 84. The combined effect of the two tank circuits and pulse generator 94 is generally similar to the combined effect of the corresponding elements in the circuits of FIGS. 2 and 5, except that in the circuit of FIG. 7 the switching between inductance coils 80 and 82 is separated by fixed periods of time during which power is transmitted to the moving assembly.

It is important to establish, at the outset, that power for the components of the moving assembly and control of electronic switches 90 and 92 is transmitted to the moving assembly through a single transformer 96 having first and second windings 96a and 96b, respectively, and information of the sensor position is transmitted from the moving assembly also through transformer 96. This is accomplished by first trans mitting power to the moving assembly, next transmitting from the moving assembly information of the position of vane 84 relative to coil 80, then transmitting power to the moving assembly and finally transmitting from the moving assembly information of the position of vane 84 relative to coil 82.

The foregoing sequence is initiated by a second logic and control circuit 98 which turns on a second pulse generator 100 to produce a fixed rate series of pulses. A counter 102 counts a prescribed number of these pulses and conditions logic and control circuit 98 to supply a timing signal which controls transmission of power to the moving assembly. Power is supplied by a first tri-state driver composed of three inverters 104, 106 and 108. Inverters 104 and 106 are controlled by the timing signal supplied by logic and control circuit 98. The output from pulse generator 100 is supplied directly to inverter 104 and through inverter 108 to inverter 106. Waveforms (K) and (L) of FIG. 8 represent the pulses supplied to inverters 104 and 106, respectively.

Figure 8:
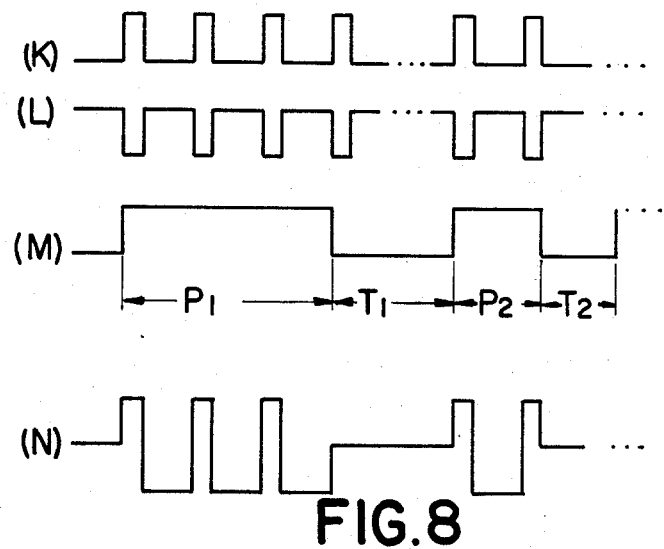
FIG. 8 is a series of waveform diagrams useful in understanding the operation of the FIG. 7 circuit.

Waveform (M) of FIG. 8 represents the timing signal supplied by logic and control circuit 98. Timing signal pulse $P_1$ causes the tri-state driver to be connected to winding 96b for the duration of pulse $P_1$. Waveform (N) of FIG. 8 represents the power transmitted to the moving assembly through transformer 96 and results from the oppositely directed pulses produced by inverters 104 and 106 being supplied to opposite ends of winding 96b. This power is supplied to an AM detector 110, connected across winding 96a, and a peak detector 112 which together form a power supply and function in the usual manner to develop a power supply voltage represented by terminal 114. This power supply voltage operates electronic switches 90 and 92, logic and control circuit 93, pulse generator 94, and an inverter 116. The actual connections between terminal 114 and the units powered by the supply voltage at this terminal have been omitted from FIG. 7 for the sake of clarity.

The output of AM detector 110 also controls the operation of logic and control circuit 93. This is accomplished by detecting the timing signals which control the transmission of power to the moving assembly. For the duration of the first timing signal pulse $P_1$, logic and control circuit 93 inactivates electronic switches 90 and 92, so that pulse generator 94 also is inactive and power can be transmitted from winding 96b to 96a.

After the termination of timing signal pulse $P_1$, inverters 104 and 106 are inactivated, so that the transmission of power is interrupted and the ends of winding 96b float. This condition is detected by AM detector 110 and logic and control circuit 93 is conditioned to close electronic switch 90 and thereby connect the tank circuit composed of inductance coil 80 and capacitor 88 to the input of pulse generator 94. Pulses having a repetition rate corresponding to the resonance frequency of this tank circuit are transmitted from winding 96a through winding 96b to counter 102. After counter 102 has counted a prescribed number of pulses, it generates a counter output pulse having a duration proportional to the time required to count the prescribed number of pulses. This is represented by pulse $T_1$ of waveform (M) of FIG. 8 which corresponds to pulse $T_1$ of waveform (C) of FIG. 3.

After the termination of pulse $T_1$, logic and control circuit 98 supplies a second timing signal pulse $P_2$ which activates inverters 104 and 106 to transmit power to the moving assembly. As with pulse $P_1$, pulse $P_2$ is detected by AM detector 110, so that logic and control circuit 93 inactivates electronic switches 90 and 92 for the duration of pulse $P_2$.

After the expiration of pulse $P_2$, logic and control circuit 93 closes electronic switch 92, so that the tank circuit composed of inductance coil 82 and capacitor 88 is connected to the input of pulse generator 94. Pulse generator 94, responsive to the second tank circuit, develops a second series of pulses having a repetition rate corresponding to the resonance frequency of the second tank circuit. These pulses are transmitted through transformer 96 to counter 102 which counts the prescribed number of pulses and develops a second counter output pulse having a duration proportional to the time required to count the prescribed number of pulses of the second series. This is represented by pulse $T_2$ of waveform (M) of FIG. 8 which corresponds to pulse $T_2$ of waveform (C) of FIG. 3 but is separated in time from pulse $T_1$ because of the intervening transmission of power during pulse $P_2$.

Upon termination of the second counter output pulse $T_2$, logic and control circuit 98 activates inverters 104 and 106 to again transmit power to the moving assembly and the cycle just described is repeated. It should be noted that the durations of timing signal pulses $P_1$ and $P_2$ are different so that logic and control circuit 93 can distinguish between the two and thereby activate the appropriate electonic switch 90 or 92 associated with the tank circuit which is to be connected to pulse generator 94 following the particular power transmission.

The counter output pulses $T_1$ and $T_2$ are supplied from logic and control circuit 98 to a second tri-state driver composed of inverters 120 and 122 which are controlled by the logic and control circuit to pass the first counter output pulses $T_1$ to a first RC circuit composed of a resistor 124 and a capacitor 126 and the second counter output pulses $T_2$ to a second RC circuit composed of a resistor 128 and a capacitor 130. The difference in the signals at a pair of terminals 132 and 134 is proportional to:

$$\frac{T_1 - T_2}{T_1 + T_2}$$

and represents the position of vane 84 relative to inductance coils 80 and 82.

The foregoing has set forth exemplary and preferred embodiments of the present invention. It will be understood, however, that various alternatives will occur to those of ordinary skill in the art without departure from the spirit or scope of the present invention.

What is claimed is:

1. Sensor apparatus comprising:
   an inductance coil sensor having first and second tank circuits and a movable metal member;
   means for moving said movable metal member, relative to the inductance coil of each of said first and said second tank circuits, in accordance with changes in a parameter being monitored to change the relative resonance frequencies of said first and said second tank circuits;
   and circuit means responsive to changes in the relative resonance frequencies of said first and said second tank circuits for developing indications of changes in said parameter being monitored, said circuit means including:
   (a) a pulse generator for producing a first series of pulses having a repetition rate corresponding to the resonance frequency of said first tank circuit and a second series of pulses having a repetition rate corresponding to the resonance frequency of said second tank circuit,
   (b) a counter responsive to said first and said second series of pulses for counting a prescribed number of pulses of said first series and the same number of pulses of said second series and for developing a first counter output pulse having a duration proportional to the time required to count said prescribed number of pulses of said first series and a second counter output pulse having a duration proportional to the time required to count said prescribed number of pulses of said second series, and
   (c) tank circuit switching means for connecting said first and said second tank circuits to said pulse generator in timed alternating sequence.

2. Sensor apparatus according to claim 1 wherein said tank circuit switching means are responsive to said counter output pulses for connecting said first tank circuit to said pulse generator for the duration of said first counter output pulse and for connecting said second tank circuit to said pulse generator for the duration of said second counter output pulse.

3. Sensor apparatus according to claim 2 wherein said circuit means further include indicating means responsive to said counter output pulses for developing an output indication of the relative time durations required for counting said prescribed number of pulses of said first series of pulses and said prescribed number of pulses of said second series of pulses.

4. Sensor apparatus according to claim 3 wherein said first and said second tank circuits have a single capacitor which is connected to said pulse generator and is switched by said tank circuit switching means between first and second inductance coils to form, in timed alternating sequence, said first and said second tank circuits.

5. Sensor apparatus according to claim 3 wherein said first and said second tank circuits have a single inductance coil which is connected to said pulse generator and is switched by said switching means between first and second capacitors to form, in timed alternating sequence, said first and said second tank circuits.

6. Sensor apparatus according to claim 3 wherein said first and said second tank circuits each have an inductance coil and a capacitor and said first and said second tank circuits are connected, in timed alternating sequence, to said pulse generator.

7. Sensor apparatus according to claim 3 wherein said indicating means include integrating means responsive to said counter output signal for developing an integration signal composed of a rising portion developed from said first counter output pulse and a decaying portion developed from said second counter output pulse.

8. Sensor apparatus according to claim 7 wherein:
   (a) said indicating means further include (i) first switching means for selectively connecting said counter to said integrating means, (ii) a capacitor, and (iii) second switching means for selectively connecting said integrating means to said capacitor; and
   (b) said circuit means further include timing means for supplying (i) a first control signal to said first switching means to disconnect said counter from said integrating means and interrupt development of said integration signal, and (ii) a second control signal to said second switching means to connect said integrating means to said capacitor to transfer the level of said integration signal to said capacitor during selected interruptions of the development of said integration signal.

9. Sensor apparatus according to claim 8 wherein the development of said integration signal is interrupted at the mid-points of said rising and decaying portions.

10. Sensor apparatus according to claim 3 wherein:
    (a) said counter includes means for supplying an inverted version of said counter output signal;
    (b) said indicating means include (i) a first integration circuit responsive to said counter output signal for developing a first integration signal composed of a rising portion developed from said first counter output pulse and a decaying portion from said second counter output pulse, (ii) a second integration circuit responsive to said inverted version of said counter output signal for developing a second integration signal composed of a decaying portion from an inverted version of said first counter output pulse and a rising portion from an inverted version of said second counter output pulse, (iii) first switching means for selectively connecting said counter to said first and second integration circuits, (iv) a capacitor, and (v) second switching means for selectively connecting said first and said second integration circuits to said capacitor; and
    (c) said circuit means further include timing means for supplying (i) a first control signal to said first switching means to disconnect said counter from said first and said second integration circuits and interrupt development of said integration signals, and (ii) a second control signal to said second switching means to connect said first and said second integration circuits to said capacitor to transfer the levels of said integration signals to said capacitor during selected interruptions of the development of said integration signals.

11. Sensor apparatus according to claim 10 wherein the development of said integration signals is interrupted at the mid-points of said rising and decaying portions.

12. Sensor apparatus according to claim 1 wherein said tank circuit switching means are responsive to said first and said second counter output pulses and include control means for delaying connecting said first and said second tank circuits to said pulse generator for fixed periods of time following the terminations of said first and said second counter output pulses.

13. Sensor apparatus according to claim 12 wherein said circuit means further include indicating means responsive to said counter output pulses for developing an output indication of the relative time durations required for counting said prescribed number of pulses of said first and said second series of pulses.

14. Sensor apparatus according to claim 13 wherein said fixed periods of time following said terminations of said first and said second counter output pulses are different.

15. Sensor apparatus comprising:
a moving assembly including:
(a) an inductance coil sensor having first and second tank circuits and a movable metal member,
(b) means for moving said movable metal member, relative to the inductance coil of each of said first and said second tank circuits, in accordance with changes in a parameter being monitored to change the relative esonance frequencies of said first and said second tank circuits,
(b) a pulse generator responsive to said tank circuits for developing a first series of pulses having a repetition rate corresponding to the resonance frequency of said first tank circuit and a second series of pulses having a repetition rate corresponding to the resonance frequency of said second tank circuit,
(c) tank circuit switching means for connecting said first and said second tank circuits to said pulse generator in timed alternating sequence in response to timing signals, and
(d) a first winding for transmitting said first and said second series of pulses and for receiving said timing signals;

and a stationary assembly mechanically isolated from said moving assembly and including:
(a) a second winding inductively coupled to said first winding for receiving said first and said second series of pulses from said first winding and for transmitting said timing signals to said first winding,
(b) a counter responsive to said first and said second series of pulses for counting a prescribed number of pulses of said first series and the same number of pulses of said second series and for developing a first counter output pulse having a duration proportional to the time required to count said prescribed number of pulses of said first series and a second counter output pulse having a duration proportional to the time required to count said prescribed number of pulses of said second series,
(c) a power source,
(d) indicating means responsive to said first and said second counter output pulses for developing an indication of the relative time durations of said first and said second counter output pulses, and
(e) control means responsive to said first and said second counter output pulses for (1) coupling said first and said second counter output pulses to said indicating means, and (2) supplying said timing signals to connect said power source to said second winding for fixed periods of time following said first and said second counter output pulses.

16. Sensor apparatus according to claim 15 wherein said fixed periods of time following said first and said second counter output pulses are different.

* * * * *